Feb. 4, 1941.  C. W. LEGUILLON  2,230,302
APPARATUS FOR REMOVING BEAD CORES FROM TIRES
Filed Nov. 20, 1935  3 Sheets-Sheet 1
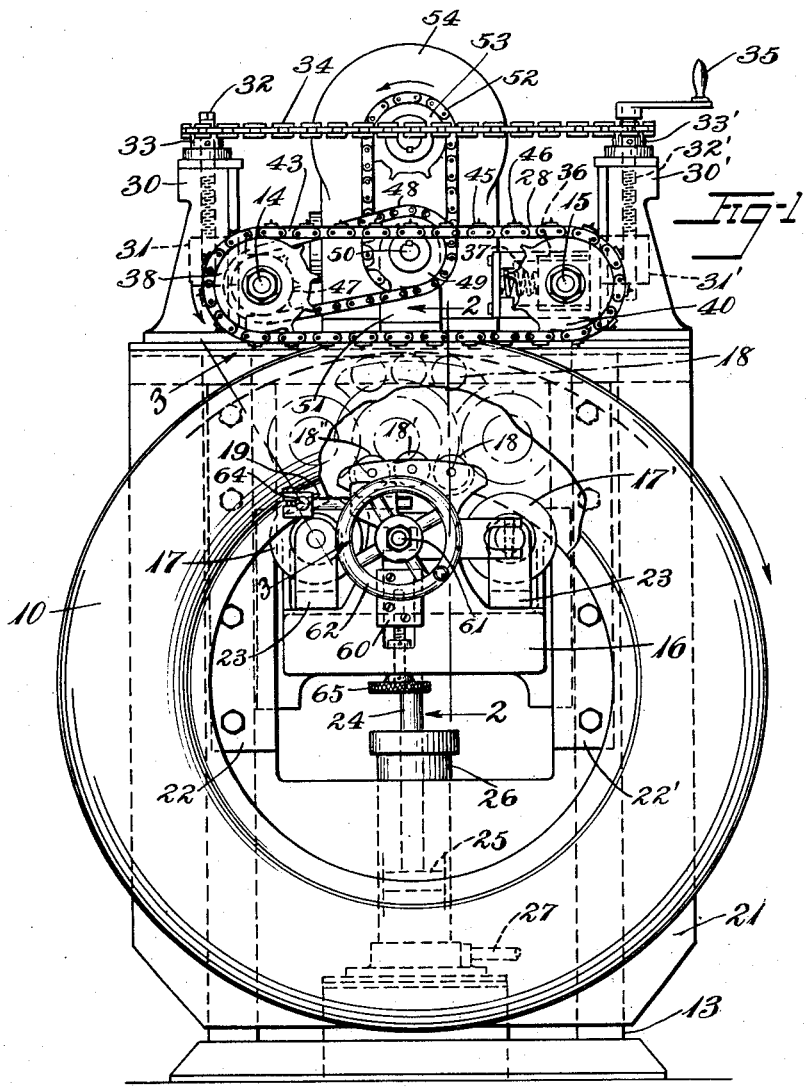

Feb. 4, 1941.  C. W. LEGUILLON  2,230,302
APPARATUS FOR REMOVING BEAD CORES FROM TIRES
Filed Nov. 20, 1935  3 Sheets-Sheet 2
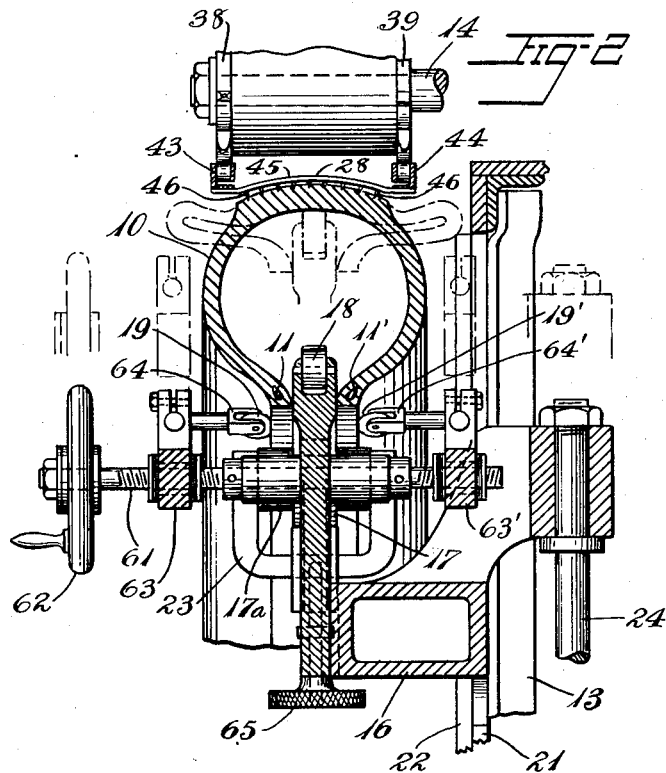
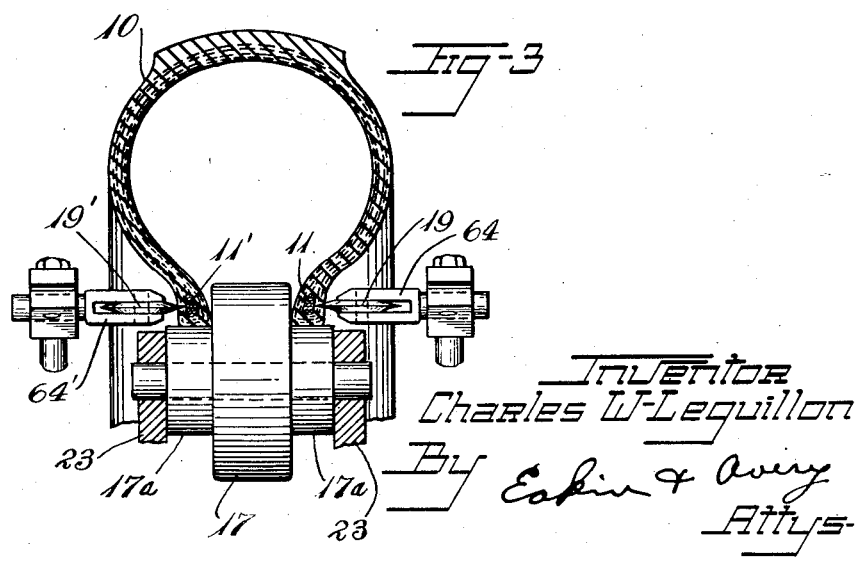
Inventor
Charles W. Leguillon
By Eakin & Avery
Attys.

Feb. 4, 1941. C. W. LEGUILLON 2,230,302
APPARATUS FOR REMOVING BEAD CORES FROM TIRES
Filed Nov. 20, 1935 3 Sheets-Sheet 3
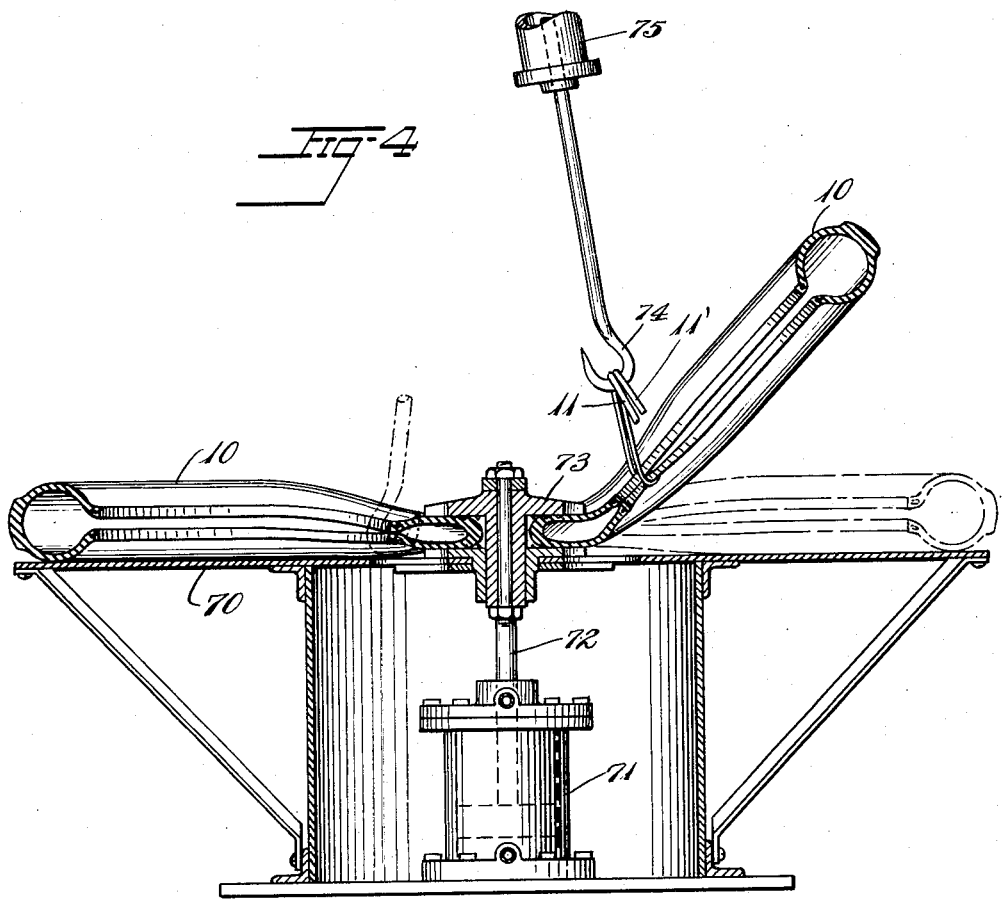
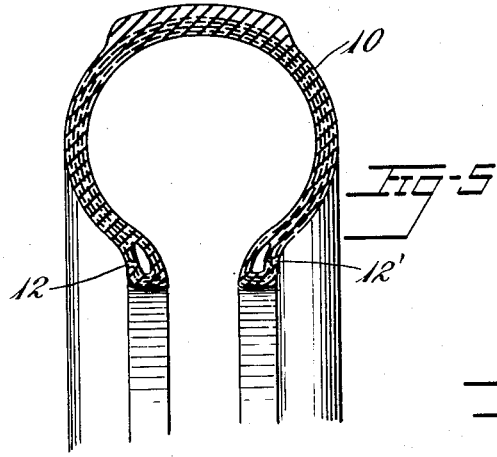
Inventor
Charles W. Leguillon
By Eakin & Avery
Attys.

Patented Feb. 4, 1941

2,230,302

UNITED STATES PATENT OFFICE 2,230,302

APPARATUS FOR REMOVING BEAD CORES FROM TIRES

Charles W. Leguillon, Akron, Ohio, assignor to The B. F. Goodrich Company, New York, N. Y., a corporation of New York Application November 20, 1935, Serial No. 50,696

7 Claims. (Cl. 164—61)

This invention relates to apparatus for removing the bead cores from used pneumatic tire casings.

Heretofore in the reclaiming of rubber and fabric material from used pneumatic tire casings it has been customary completely to sever the bead portions from the tread and side walls of the casing, and the rubberized fabric surrounding the metallic bead cores has been wasted.

The principal objects of this invention are to provide means for removing the bead cores without waste of fabric and rubber material, and to provide efficiency, accuracy, and simplicity of operation.

Other objects will appear from the following description and the accompanying drawings.

Of the drawings:

Fig. 1 is a front elevation of the bead-slitting mechanism in its preferred form with a tire casing in place thereon, part of the tire being broken away to show the mechanism, the position of the supporting mechanism when operating upon a collapsed tire being shown in dot and dash lines.

Fig. 2 is a cross-sectional view taken on line 2—2 of Fig. 1, the positions of the tire when flattened, and the associated parts of the slitting mechanism when in their elevated positions, being shown in dot and dash lines, parts of the apparatus and of the tire being broken away.

Fig. 3 is a fragmentary sectional view taken on line 3—3 of Fig. 1.

Fig. 4 is a vertical sectional elevation of the device used for removing the bead cores after the casing has been slit, parts of the pulling mechanism being broken away.

Fig. 5 is a cross-sectional view of a tire casing after the bead cores have been removed therefrom.

Referring to the drawings, the numeral 10 designates a pneumatic tire casing having a pair of metallic bead cores 11, 11' enclosed by layers of fabric or cord. In practicing this invention annular slits 12, 12' (see Fig. 5) are progressively formed through the plies of cord or fabric surrounding the beads and the bead cores are removed through these slits.

The apparatus for slitting the tire casing preferably comprises a pedestal frame 13 which supports a pair of parallel shafts 14, 15 which are horizontally disposed to drive a tractor belt adapted to conform to and contact with the tread of the tire 10. A vertically movable carriage 16 is slidably mounted on the pedestal and carries idle rolls 17, 17' for supporting and guiding the bead portions of the tire and additional guide rollers 18, 18', 18'', for supporting the tread portion of the tire. These rolls cooperate with the tractor belt to drive the tire upon its axis. Means are also provided for feeding a pair of slitting cutters 19, 19' (see Figs. 2 and 3) against the bead portions of the tire. The apparatus may be described more in detail as follows:

For supporting the tire casing the pedestal 13 is provided with a plate 21 having a rectangular opening formed therein. The carriage 16 is guided along the vertical edges of the rectangular opening by gibs 22, 22'. Guide rolls 17, 17' are journaled in ears 23 formed on the carriage 16. Each roll is provided with a central portion of large diameter flanked by portions 17ª of reduced diameter on which the bead portions of the tire rest.

Where the tires are of such pliability that they collapse before sufficient pressure has been applied thereto to drive them without slipping, the rollers 18 are provided for contacting with the tread portion of the tire. These rolls 18 are also mounted to rotate freely in bearings provided therefor and supported by the carriage.

The carriage 16 is attached to a piston rod 24 having a piston 25 attached thereto. The piston 25 operates vertically in a cylinder 26 which may be supplied with fluid under pressure from any source, not shown, through a pipe 27, for raising the carriage.

To support and drive the tractor belt 28, a pair of brackets 30, 30' are fixed to the pedestal 13 and are formed with vertical guideways. A pair of carriages 31, 31' are slidably mounted on the brackets and may be raised or lowered by feed screws 32, 32' journaled therein. The feed screws have sprockets 33, 33' fixed thereto and a sprocket chain 34 engages both sprockets so as to move the carriages in unison. A crank 35 is fixed to the shaft 32' whereby the feed screws may be operated. Shaft 14 is rotatably mounted in fixed bearings on carriage 31, whereas shaft 15 is journaled in a bearing 36 horizontally slidable in carriage 31' and retained by a coil spring 37. Shaft 14 has fixed thereto a pair of sprockets 38, 39, (see Fig. 2) and similar sprockets 40 are located on shaft 15. These sprockets engage chains 43, 44 which are fastened together at spaced intervals by cross bars 45 which are equipped with teeth 46 for engaging the tread of the tire. Shaft 14 also has fixed thereto a sprocket 47 adapted to be driven by a chain 48 from a sprocket 49 fixed to a shaft 50. Shaft 50 is journaled in a bearing 51 fixed to the pedestal 13, the arrangement being such that shaft 14 may be raised and lowered without disengaging the drive. Shaft 50 is driven by a chain 52 from a sprocket 53 fixed to the speed reducer 54 which in turn is driven by an electric motor, not shown.

By adjusting the crank 35, the tractor belt may be raised or lowered to primarily adjust the device to a certain size of tire, whereas the movement of the carriage 16 vertically is used for removing or replacing tires of substantially the same size.

The slitting mechanism is mounted on the carriage 16 and comprises a block 60 vertically adjustable on the carriage 16 and providing bearings for a right and left feed screw 61 (see Fig. 2), to which is fixed a hand-wheel 62. A pair of arms 63, 63' are threaded to engage rod 61 and are provided with cutter holders 64, 64' adjustable thereon for supporting cutters 19, 19'. A screw 65 is provided to adjust the slitting device vertically with respect to the carriage 16.

In the operation of the slitting mechanism, carriage 16 is lowered and a tire casing is placed on the rolls 17, 17'. The carriage 16 is raised to press the casing against the tractor belt 28. As the tire is propelled by the tractor belt the hand-wheel 62 is manipulated to force the cutting discs 19, 19' through the outer layers of fabric to the metal bead cores. The tire may then be removed by lowering the carriage 16.

After the casings have been slit they are placed on the table 70 where the bead cores are removed. To hold the tires in place clamping mechanism is provided preferably comprising a cylinder 71, located below the table and having a piston rod 72 adapted to extend through the table. The clamp head 73 is fixed to the upper end of the piston rod 72. The cylinder 71 is supplied with pressure fluid from any convenient source, not shown, and is adapted to clamp one or more tire casings to the table as shown in Fig. 4. A sharply pointed hook 74 is attached to a pulling device above the table, preferably an air lift 75. The tire is clamped by its side wall and tread portions so as to expose its bead portions. When the hook 74 is engaged about the bead portion of a tire and the lift 75 is energized, the hook tears its way through the bead portion at its point of engagement and due to the slit formed adjacent the bead cores, the beads are pulled from the casing through the slit. After the bead cores have been removed the tire casing appears as shown in Fig. 5.

I claim:

1. Apparatus for removing bead cores from used pneumatic tire casings, said apparatus comprising means for supporting the casing from within, means adapted to contact with the tread of the casing to rotate the casing about its axis, and means for progressively slitting the plies overlying the bead cores as the casing is rotated.

2. Apparatus for removing bead cores from used pneumatic tire casings, said apparatus comprising means for supporting the casing from within, a tractor belt adapted to contact with the tread of the casing to rotate the casing about its axis, and means for progressively slitting the plies overlying the bead cores as the casing is rotated.

3. Apparatus for removing bead cores from used pneumatic tire casings, said apparatus comprising roller means for supporting the casing from within, means adapted to contact with the tread of the casing to rotate the casing about its axis, and means for progressively slitting the plies overlying the bead cores as the casing is rotated.

4. Apparatus for removing bead cores from used pneumatic tire casings, said apparatus comprising driving means adapted to contact with the tread of the casing, roller means for engaging the bead portions of the casing, means for pressing the roller means toward said driving means to rotate the casing about its axis, and means for progressively slitting the plies overlying the bead cores as the casing is rotated.

5. Apparatus for removing bead cores from used pneumatic tire casings, said apparatus comprising a driving belt adapted to conform to the tread of the casing and frictionally to rotate the casing about its axis, anti-friction pressing means for contacting with the bead portions of the casing to guide the same, and slitting means adapted progressively to slit the plies overlying the bead cores as the casing is rotated.

6. Apparatus for removing bead cores from used pneumatic tire casings, said apparatus comprising a driving belt adapted to conform to the tread of the casing and frictionally to rotate the casing about its axis, roller means for supporting the beads of the tire in spaced relation and pressing the casing against the driving belt, and slitting means adapted progressively to slit the plies overlying the bead cores as the casing is rotated.

7. Apparatus for removing bead cores from used pneumatic tire casings, said apparatus comprising belt means for contacting with the tread portion of the casing to drive the casing about its axis, a carriage movable toward and from the belt and adapted to press the casing against the belt, rollers carried by the carriage for engaging the casing, a pair of slitting cutters for slitting the plies of the casing overlying the bead cores, and feeding means supported by the carriage for forcing the cutters against the casing

CHARLES W. LEGUILLON.